INVENTOR.
ROBERT W. FRITTS
BY
Carpenter Abbott Coulter & Kinney
ATTORNEYS

INVENTOR.
ROBERT W. FRITTS
BY
Carpenter Abbott Coulter & Kinney
ATTORNEYS

United States Patent Office 3,326,727

Patented June 20, 1967

3,326,727

THERMOPILE MODULE WITH DISPLACEMENT PERMITTING SLOTTED THERMOJUNCTION MEMBERS

Robert W. Fritts, Arden Hills, Minn., assignor to Minnesota Mining and Manufacturing Company, a corporation of Delaware Filed July 11, 1962, Ser. No. 209,491
6 Claims. (Cl. 136—208)

This invention relates to improvements in thermoelectric devices and to the method of making such devices.

The development of efficient thermoelectric devices dictates the use of thermoelectric materials having a high figure merit. The best presently known materials for this purpose are semiconductors which, unfortunately, are low in physical strength and are extremely frangible. High efficiency and high power output require the use of relatively short elements operated in a high temperature gradient. To date it has been common practice to utilize a pressure contact between each thermoelement and its attendant hot junction electrode allowing a degree of sliding movement therebetween to relieve thermal expansion stresses. However, with the recent development of bonding techniques which provide strong metallurgical bonds for improved thermal and electrical conductivity, the present mounting methods are no longer adequate. An all-bonded thermopile structure having a number of thermojunction members which are massive enough to minimize power loss, tends to subject the individual thermoelements to excessive stresses unless special mounting means are provided.

What ever the mounting means, they should not conduct large amounts of heat from the hot to the cold thermojunction members as this will shunt heat around the thermocouple elements, thereby reducing efficiency. Heretofore, the problem of mounting a large number of thermojunction members in an all-bonded thermopile structure without subjecting the individual thermoelements to undue thermal stresses and without excessive power or heat loss has remained unsolved.

It is a general object of this invention to provide an improved thermopile subassembly or module and an improved compression mounting for said module which will apply a uniform compression on all the elements thereof and which will prevent fracture of the thermoelements.

Another object of this invention is to provide a module of the class described in which uniform compression of each element in the module is accomplished by means of a single diaphragm-type spring and cooperating retaining means whereby waste heat is held to a minimum.

A further object of this invention is to provide an independent module support in a thermoelectric generator containing many such modules, thus rendering the generator operable even though the generator enclosure may warp in shape due to the differential thermal expansion forces.

It is a further object of this invention to provide a thermopile module in which massive junction electrodes may be utilized to reduce electrode power loss to a minimum without placing damaging stresses upon the thermoelements.

It is a still further object to provide a novel method for inexpensively fabricating the improved thermoelectric module structure.

These and further objects and advantages of the invention will become apparent as the description proceeds, reference being had to the drawings accompanying and forming a part of this specification, in which.

Figure 1:
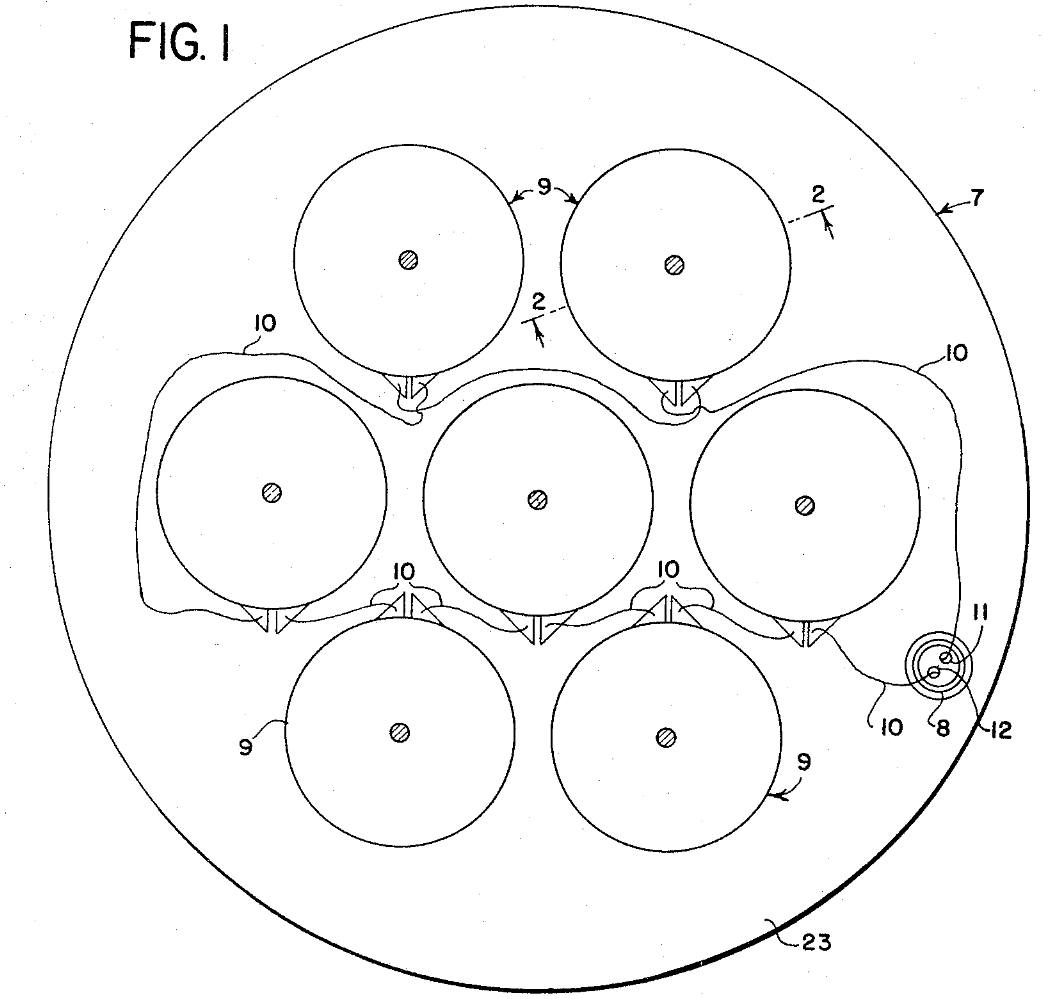
FIGURE 1 is a diagrammatic plan view illustrating one arrangement of a plurality of the thermopile modules in a thermoelectric generator constructed in accordance with the present invention, a portion of the generator enclosure being removed.

Referring now to the drawing, particularly to FIGURE 1, there is illustrated a thermoelectric generator generally designated 7, comprising a plurality of thermopile modules 9 in a hexagon shaped pattern on a base plate 23 which forms part of an hermetically sealed enclosure 8, as will hereinafter appear. The modules 9 are electrically connected in series by suitable flexible conductors or leads 10 which are in turn connected to the pins 11 and 12 of a double pin glass-to-metal hermetic seal 8 to permit connection of the modules 9 to an external circuit.

Figure 2:
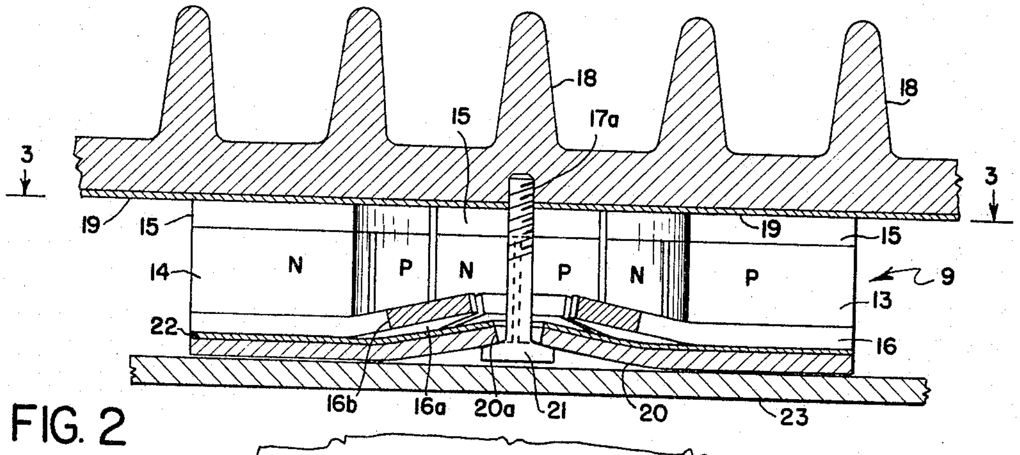
FIGURE 2 is an enlarged fragmentary vertical sectional view of one of the thermoelectric modules of the present invention taken approximately along the line 2—2 of FIGURE 1.
Figure 3:
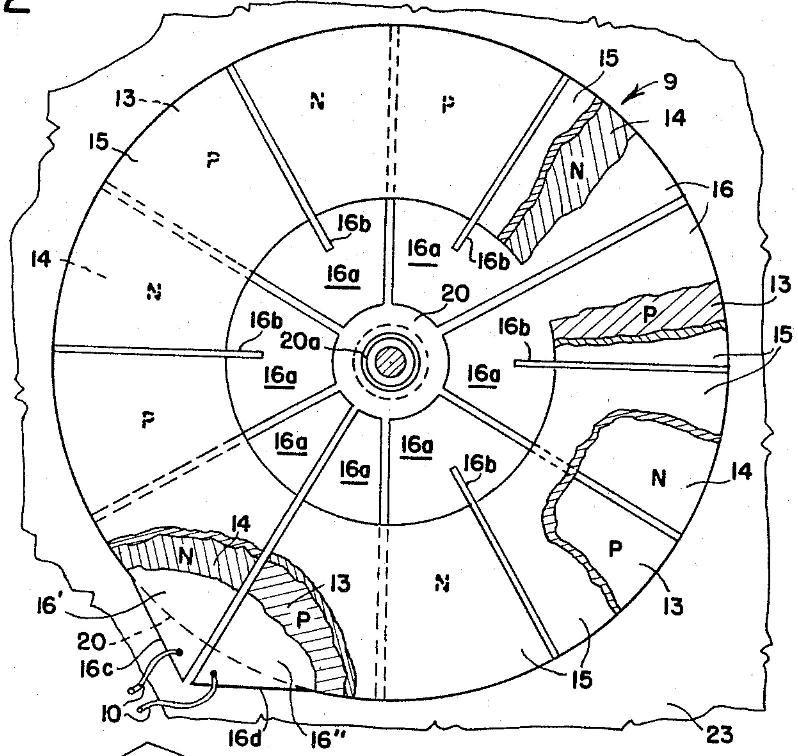
FIGURE 3 is a fragmentary plan view taken along the line 3—3 of FIGURE 2.
Figure 4:
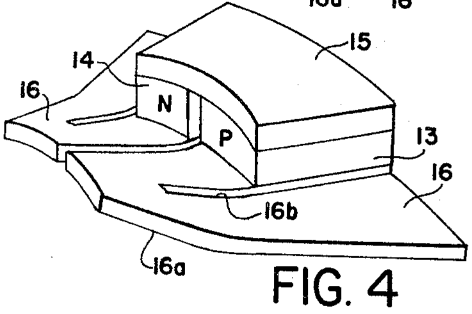
FIGURE 4 is a fragmentary perspective view of a basic thermocouple forming a part of the present invention.

Each thermopile module 9, shown most clearly in FIGURES 2, 3 and 4, is formed of a circular array of spaced, arcuate, generally sector shaped P- and N-type thermoelements 13 and 14, respectively. The thermoelements 13 may, for example, be formed of a P-type lead telluride alloy, and are alternated with the thermoelements 14 which may, for example, be formed of an N-type lead telluride alloy. The sectors 13 and 14 are connected in series electrically through metallic electrodes or thermojunction members 15 and 16 which are bonded thereto and are preferably formed of a suitable iron alloy.

The thermojunction members or hot junction electrodes 15 are plates of arcuate, generally sector shape and are each bonded to the upper surface of a P-type thermoelement 13 and to the coplanar upper surface of an adjacent N-type thermoelement 14. The thermojunction members or cold junction electrodes 16 are plates of nearly triangular sector shape and extend radially inwardly much further than do the members 15 and each has an upturned central apex or tongue portion *16a*. Each cold junction electrode 16, has a radial slot *16b* extending from the outer edge thereof to a point radially inwardly of the thermoelements 13 and 14 such that said electrode is given a generally V-shape in plan view. Each electrode 16 has one end or arm thereof bonded to the lower end surface of a P-type thermoelement 13 and has its other arm bonded to the coplanar lower surface of an adjacent N-type thermoelement 14, electrically joining said elements through the tongue portion *16a* thereof.

In place of one of the electrodes 16, separate electrodes 16′ and 16″ are bonded to the coplanar lower surfaces of the thermoelements 13 and 14 which constitute the end elements of the thermopile. The electrodes 16′ and 16″ are formed with tab portions *16c* and *16d* on the peripheral edge thereof to which the conductors 10 are electrically connected, as by soldering.

The V-shaped configuration of each cold junction electrode 16 permits slight angular displacement of its spaced arms through flexure at its bight portion. Such flexure permits movement of the thermoelements 13 and 14 in response to expansion and contraction of the hot junction electrodes 15 and thereby relieves the shearing stresses which would otherwise tend to fracture said thermoelements. With such displacement available at the cold junction electrodes 16, it is not necessary to provide for any bending or flexure of the hot junction electrodes 15. As a result, the hot junction electrodes 15 may be formed as thick as desired for high thermal and electrical conductance between the P-type and N-type elements of each couple.

The hermetically sealed enclosure 8 enclosing the modules 9 is formed by the base plate 23 and a pan-shaped enclosure member 17, which may be a stainless steel casting provided with fins or raised rib portions 18 on the outer surface thereof. The member 17 is adapted to be placed adjacent a flame, hot gaseous flue or other heat producing medium for effecting the temperature differential necessary for the operation of thermopile modules 9. A thin sheet of electrical insulating and heat conducting material 19, for example mica or other similar high temperature heat-resistant electrical insulation, is placed between the hot junction electrodes 15 and the flat inner surface of the member 17.

Each module 9 is compressed and held against the inner surface of the enclosure member 17 by a resilient metallic diaphragm or plate 20 and by a retaining bolt 21 extending through a central opening 20*a* in said plate and axially through the module. Each bolt 21 is threadably received in an opening 17*a* in the member 17 and is preferably formed of Inconel or other material having high strength at elevated temperatures. The resilient plate 20 bears upon the array of cold junction electrodes 16 and is insulated therefrom by a thin sheet of electrically insulating material 22, such as mica or other suitable thermally conductive electrical insulation. The use of the single bolt 21, to hold each module 9 compressively against the member 17, minimizes the amount of heat from being conducted from the member 17 to the cold junction electrodes 16.

Since each thermoelement 13 and 14 of each module 9 is placed in a symmetrical relation with respect to the central retaining bolt 21, the compression plate 20 equalizes the thermal expansion stresses among all the thermoelements of the module and any differential thermal expansion in the axial direction is relieved by said compression plate 20. Moreover, each module 9 may respond to local changes in curvature of the "hot" member 17 without damage to the individual thermoelements 13 and 14 of said modules.

The above described assembly can be easily and inexpensively fabricated by mass production techniques. In the practice of the preferred method of the present invention, the thermojunction members 15 and 16 are formed from flat ring-shaped blanks of electrically and thermally conductive material. The thermoelements 13 and 14 are preformed, as by powder metallurgy techniques, and are arranged in alternate fashion between two such ring-shaped blanks. With the parts so arranged, heat and pressure is applied to the ouer surfaces of the blanks, in this sandwich type assembly, as by suitable heated clamping jaws (not shown) to fuse or sweat together the thermoelements and ring-shaped blanks. The assembly is then cooled and the pressure released and the parts of the assemblage are now thermally and conductively bonded to each other.

After bonding, one ring-shaped blank, the width of which equals the radial length of the thermoelements, is cut radially to form the spaced hot thermojuncion members 15 illustrated in FIGURES 3 and 4, each member 15 thus formed spanning and joining one P-type element 13 and one N-type element 14. The other ring-shaped blank, which has a width to extend radially inwardly beyond the array of thermoelements, is then cut radially between each pair of thermoelements spanned by the hot thermojunction members 15 to form the spaced cold thermojunction members 16, and the radial slots 16*b* are cut therein between thermoelements joined by said cold members 16 (as shown). The cutting may be accomplished by means of an abrasive slotting wheel or the like. Since the slots 16*b* are in registration with the cuts made in forming the hot thermojunction members 15, these cuts may be formed simultaneously.

The module 9 thus formed may then be dipped or otherwise coated with a suitable protective material, for example glass frit, to restrict sublimation or oxidation of the thermoelements at elevated temperatures.

After all the modules 9 are affixed to the enclosure member 17, the plate 23 is assembled thereto in good thermal contact with the compression plate 20 of each module 9. The plate 23 may be formed of flexible stainless steel or other suitable metal having good thermal conductivity permitting it to readily transfer heat from the cold junction members 16 and plates 20 to the ambient atmosphere or other cooling medium with which the exterior surface of said plate 23 may be placed in contact. Any suitable cooling means may be used to aid in cooling of the plate 23 in order to provide a high temperature differential across each module. The plate 23 is suitably fixed at the outer edges thereof to the plate 17 by means such as welding or soldering to effect hermetic sealing of the enclosure 8. Prior to the final sealing, the enclosure 8 may be evacuated to insure a pressure contact between the plate 23 and the plates 20, thereby enhancing heat transfer therebetween.

Figure 5:
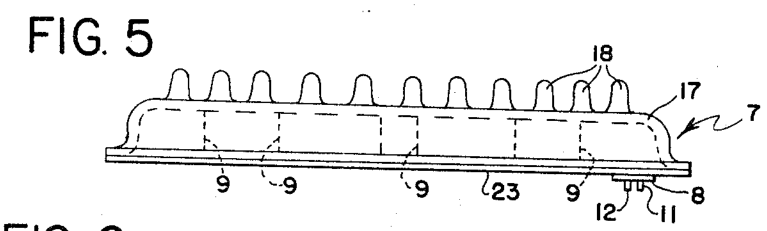
FIGURE 5 is a side elevation view of the generator shown in FIGURE 1 when said generator is not in use.
Figure 6:
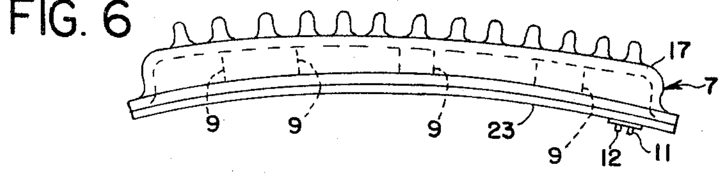
FIGURE 6 is a side elevation view, similar to that of FIGURE 5, illustrating in a somewhat exaggerated manner warpage of the generator enclosure which may occur under operating conditions.

When no heat is supplied to the ribbed member 17, the generator structure has a flat appearance, as illustrated in FIGURE 5. When heat is applied to the member 17 during normal operation, the generator structure may warp due to thermal expansion forces, in a manner shown somewhat exaggerated in FIGURE 6. Since the individual modules 9 are independently supported and interconnected electrically by the flexible conductors 10 as shown in FIGURE 1, the warping of the entire generator assembly causes only minor stress to be placed on the thermoelements of each module. This limited stress is absorbed by the movement permitted by flexure of each of the cold junction electrodes 16 and by flexure of the compression plates 20 and does not have any deleterious effect on the individual elements.

The structure of the individual module 9 is particularly well adapted for use in power generation applications which call for the use of particularly large temperature differentials. The modules 9 are also, however, well adapted for use as Peltier heating or cooling devices as well as power generating devices.

While one embodiment of the invention has been shown and described, it will be appreciated that this is for the purpose of illustration and that changes and modifications can be made therein without departing from the spirit and scope of the invention.

What is claimed is:

1. A thermoelectric module comprising a plurality of spaced P-type and N-type thermoelements arranged alternately in an arcuate array and having opposite end surfaces, a set of thermojunction and heat transfer plates bonded to one end surface of each of said thermoelements spanning and joining each of said P-type thermoelements to an adjacent N-type thermoelement, and thermojunction and heat transfer means bonded to the other end surfaces of said thermoelements to span and join said thermoelements in series circuit relation, said thermojunction and heat transfer means comprising generally V-type shaped thermojunction members circumferentially offset from said plates providing said series circuit relation with said plates and thermoelements, said V-shaped members having the bight portions thereof positioned radially inwardly of said array of thermoelements to permit annular displacement of said thermoelements when said plates are subjected to high temperatures causing expansion of the same.

2. A thermopile module comprising a plurality of spaced P-type and N-type thermoelements arranged alternately in an arcuate array and having parallel end surfaces lying in first and second planes, a plurality of first thermojunction plates each bonded to one P-type thermoelement and one adjacent N-type thermoelement at the end surfaces thereof lying in said first plane, a plurality of second thermojunction plates each bonded to said one P-type thermoelement and the other adjacent N-type thermoelement at the end surfaces thereof lying in said second plane to join said thermoelements in series circuit relation, said second thermojunction plates each being formed with a slot extending from the radially outermost edge of the plate between the thermoelements and radially inwardly of said array to permit relative displacement of said thermoelements when said first and second thermojunction plates are subject to differential temperatures.

3. A thermopile module comprising a plurality of spaced P-type and N-type thermoelements arranged alternately in an arcuate array and having parallel end surfaces lying in first and second planes, first thermojunction members each fused to one P-type thermoelement and one adjacent N-type thermoelement at the end surfaces thereof lying in said first plane, and second V-shaped thermojunction members each having one arm thereof fused to said one P-type thermoelement and the other arm thereof fused to the other adjacent N-type thermoelement at the end surfaces of said thermoelements lying in said second plane to join said thermoelements in series circuit relation, the bight portion of said V-shaped members being positioned radially inwardly of said array to permit relative arcuate displacement of said thermoelements when said first and second thermojunction members are subjected to differential temperatures.

4. A thermoelectric device comprising a plurality of spaced P-type and N-type thermoelements arranged in spaced relation and alternately in an arcuate array and having parallel end surfaces lying in first and second planes, a first set of thermojunction plates bonded one to each P-type thermoelement and to an adjacent N-type thermoelement at the end surfaces thereof lying in said first plane, a second set of thermojunction plates, one of said second set of thermojunction plates being bonded to the end surface on a P-type thermoelement and another of said second set of thermojunction plates being bonded to the end surface of an adjacent N-type thermoelement which said P-type and N-type thermoelements are not joined by said first set of thermojunction plates and the remaining thermojunction plates of said second set being bonded to the end surface of the remaining P-type thermoelements and to the other adjacent N-type thermoelement at the end surfaces thereof lying in said second plane to connect said thermoelements in series circuit relation, each of said remaining thermojunction plates being formed with a slot between the thermoelements joined thereby which slot extends from the radially outermost edge of the plate radially inwardly of said array to permit relative displacement of said thermoelements when the thermojunction plates of said first and second set are subjected to differential temperatures, said one and said another thermojunction plate of said second set being adapted for the connection of leads, a heat transfer member positioned in adjacent parallel relation with respect to said first thermojunction plates, electrically insulating and thermally conductive means positioned between said heat transfer member and said first thermojunction plates, a resilient member positioned adjacent said second set of thermojunction plates, and single fastening means extending substantially axially through said array joining said resilient member to said heat transfer member to mount said array upon said heat transfer member and place said thermoelements under uniform compressive stress.

5. A thermoelectric device comprising a plurality of spaced P-type and N-type thermoelements arranged alternately in an arcuate array and having parallel end surfaces lying in first and second planes, a plurality of first thermojunction plates each bonded to one P-type thermoelement and one adjacent N-type thermoelement at the end surfaces thereof lying in said first plane, a plurality of second thermojunction plates each bonded to said one P-type thermoelement and the other adjacent N-type thermoelement at the end surfaces thereof lying in said second plane to join the thermoelements in series circuit relation, said second thermojunction plates each being formed with a slot extending from the radially outermost edge of the plate between the thermoelements and radially inwardly of said array to permit relative displacement of said thermoelements when said first and second thermojunction plates are subjected to differential temperatures, a heat transfer member positioned in adjacent parallel relation with respect to said first thermojunction plates electrically insulating and thermally conductive means positioned between said heat transfer member and said first thermojunction plates, a resilient member positioned adjacent said second thermojunction plates, and means extending substantially axially through said array joining said resilient member to said heat transfer member to mount said array upon said heat transfer member and place said thermoelements under uniform compressive stress.

6. A thermoelectric device as described in claim 5, wherein said means extending substantially axially through said array is a single bolt extending through said resilient member and fastened to said heat transfer member.

References Cited

UNITED STATES PATENTS

| | | | |
|---|---|---|---|
| 2,983,031 | 5/1961 | Blanchard | 29—155.5 |
| 2,985,949 | 5/1961 | Rice | 29—155.5 |
| 3,006,979 | 10/1961 | Rich | 136—4 |
| 3,010,285 | 11/1961 | Penn | 62—3 |
| 3,035,109 | 5/1962 | Sheckler | 136—4 |

WINSTON A. DOUGLAS, *Primary Examiner.*

JOHN H. MACK, *Examiner.*

A. M. BEKELMAN, *Assistant Examiner.*